SUB-MINIATURE MULTI-SIGNAL MECHANICAL COMMUTATOR

Filed April 24, 1959 2 Sheets-Sheet 1

INVENTORS.
JOHN F. BRINSTER
EVERETT B. GARRETSON
BY
Ralph K. Bonell
AGENT

SUB-MINIATURE MULTI-SIGNAL MECHANICAL COMMUTATOR

Filed April 24, 1959 2 Sheets-Sheet 2

INVENTORS.
JOHN F. BRINSTER
EVERETT B. GARRETSON
BY
Ralph K. Bonell
AGENT 2,984,715

SUB-MINIATURE MULTI-SIGNAL MECHANICAL COMMUTATOR

John F. Brinster and Everett B. Garretson, Princeton, N.J., assignors to General Devices, Inc., Princeton, N.J., a corporation of New Jersey Filed Apr. 24, 1959, Ser. No. 808,717

3 Claims. (Cl. 200—26)

This invention relates to high speed rotating commutators or switches of the type wherein a brush sweeps over a segmented contact member to connect a plurality of individual electrical circuits, in turn, to a common circuit. More particularly, it refers to miniature or sub-miniature apparatus of the foregoing character which is suitable for the reliable switching, at high operating speeds, of low impedance circuits carrying variable information signals.

Commutators of the disclosed type find application, for example, in certain classes of telemetering systems where periodic samples of a plurality of information signals supplied by electrical pick-ups are transmitted in rapidly repeated sequences to a distant receiver over a single radio or wire circuit. In such applications it is of prime importance that the sample signals supplied to the common transmission path accurately represent the values of the protoype signals during the respective sampling periods thereof. A common source of distortion when the pick-up circuits are of low impedance, and particularly when the signals in these circuits occur at a low level, is the introduction during the switching operation of a variable added impedance in the form of commutator contact resistance, resulting in the production of electrical noise.

Besides the minimizing of such electrical noise the design of commutators for the type of service above referred to should provide for accurate relative phasing of the signals in the various commutated channels. Also, in many cases, particularly in the telemetering of missile data, the apparatus must be as small as practicable, of rugged construction and be capable of functioning under high acceleration.

The present invention presents commutating apparatus adapted for miniaturization comprising, in a novel assembly, accurately phaseable, segmented commutator contact members of rugged construction in conjunction with brushes of low mass which have a low and substantially constant contact resistance.

It is an object of the invention to provide improved commutating apparatus of the described character adapted to minimize the distortion of sampled electrical signals, particularly signals switched in low impedance circuits.

Another object is to provide in apparatus of the described character an improved segmented commutator contact member, and a method of construction thereof, which is of simple and rugged construction and one which permits the wiring of the different information channels to be readily carried out.

Another object is to provide brushes and mountings therefor of improved design for operation with contact members of the foregoing type.

These and other objects and advantages of the invention will be better appreciated upon consideration of the following detailed description of a preferred form of the invention, illustrated by the accompanying drawings in which.

Figure 1:
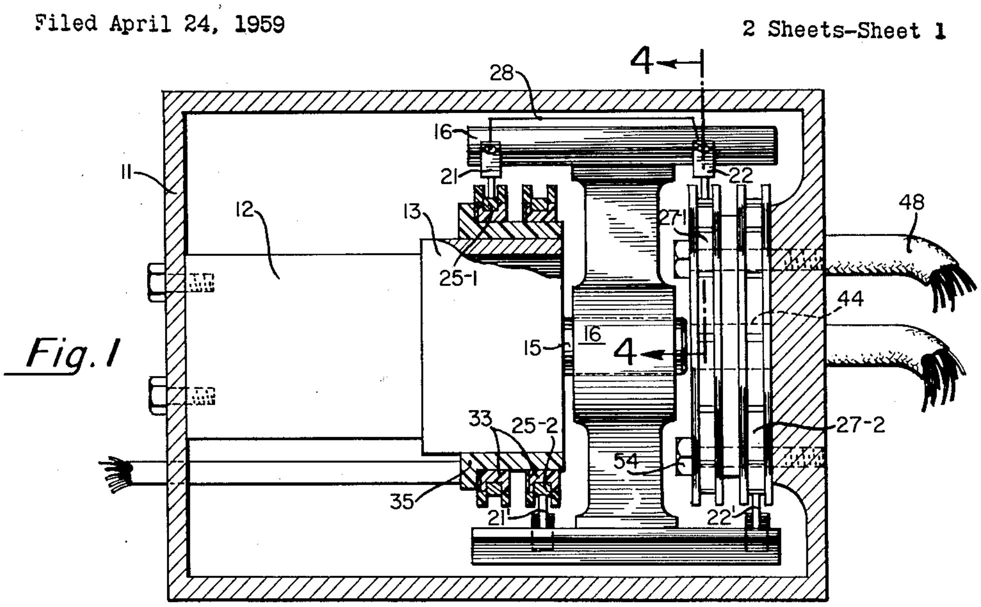
Fig. 1 is an elevation of assembled commutating apparatus, in accordance with the principles of the invention, partly in section.
Figure 2:
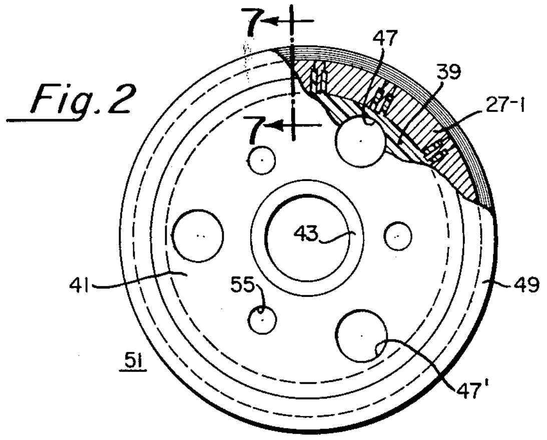
Fig. 2 is a front view of a commutator contact unit found in the assembly of Fig. 1, also partly in section.
Figure 3:
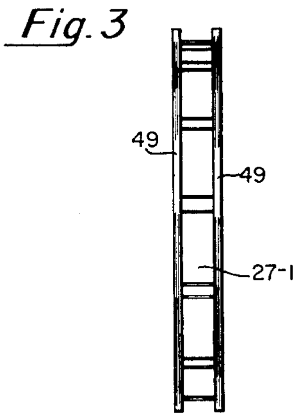
Fig. 3 is an end view of the unit of Fig. 2.
Figure 5:
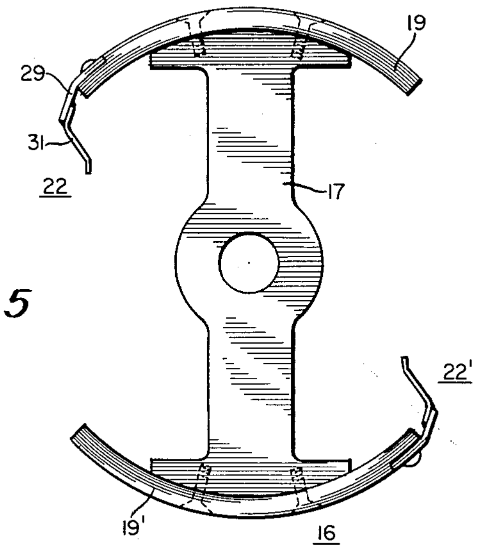
Fig. 5 is an end view of a rotatable commutator brush mount found in the assembly of Fig. 1.

Referring, now, to the figures, there is shown a housing 11 on which is mounted a motor 12 driving, by way of a speed reduction gear in gear box 13, a shaft 15 carrying a rotatable brush mount 16. Brush mount 16 comprises a spider 17 (Fig. 5) carrying opposed arcuate brush supports 19, 19' of insulating material which, in the assembly, are coaxial with and extend along the axis of shaft 15. Near the ends of mount 16 in an axial direction, are mounted diametrically opposed pairs of brushes or brush assemblies 21, 21' and 22, 22', both seen in Fig. 1. Brushes 21, 21' cooperate with collector rings 25–1 and 25–2, respectively, while brushes 22, 22' cooperate with segmented cylindrical commutator contact members 27–1 and 27–2. An electrical connection is made between brushes 21 and 22, as by connecting wire 28, and between brushes 21' and 22' (not shown). Each brush assembly comprises a metal plate, as plate 29, (Fig. 5) to which are soldered a number of small diameter brush wires 31, for example three wires, in parallel alignment. These and the contact members on which they bear are of a precious metal alloy, the two contacting metals being chosen for their low contact resistance. The brush wires, pre-formed to give a desired contact pressure, are at their contact-making end portions bent to conform over a short arc to the curvature of the opposed cylindrical members on which they bear and are run-in to obtain smooth contact therewith. The contact-making end portions of the brush wires have a minimum length sufficient to bridge the gaps between the segments of contact members 27 (27–1 and 27–2). Usually in these members live and dead segments alternate. The maximum length of the end portions of the brush wires is from one-quarter to one-half the width of the narrower, usually the dead, contact segments.

Figures 4, 7:
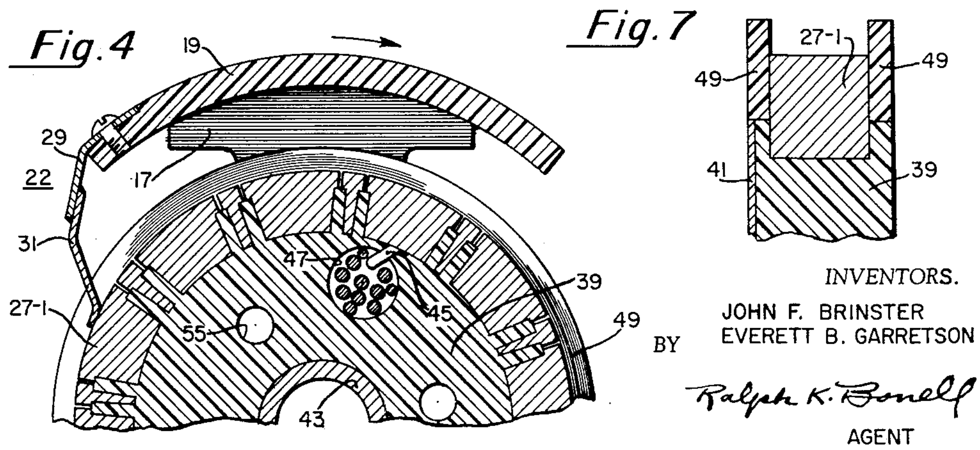
Fig. 4 is a fractional sectional view taken along the line 4—4 of Fig. 1, to an enlarged scale.
Fig. 7 is a fractional sectional view taken along the line 7—7 of Fig. 2, to an enlarged scale.
Figure 6:
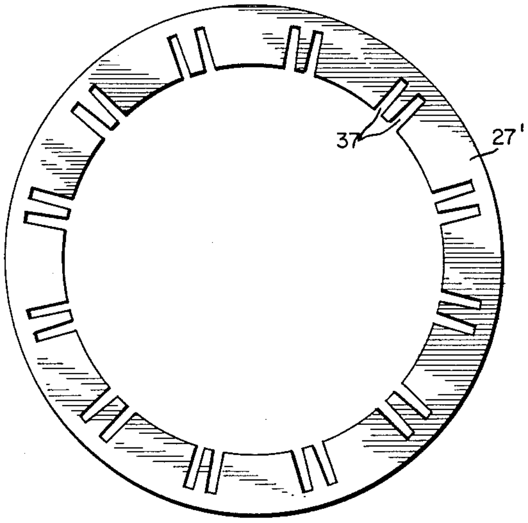
Fig. 6 shows a blank for fabricating a segmented contact member found in the contact unit of Fig. 2.

Collector rings 25–1, 25–2 each are supported by an annular insulating member 33 molded integral therewith and fixed on insulating sleeve 35 about gear box 13. Commutator contact members 27–1, 27–2 are fabricated from relatively thin continuous ring-shaped blanks, as ring blank 27' (Fig. 6), which have internal notches 37 forming sections of reduced radial thickness at angular locations corresponding to the proposed locations of the cuts defining the segments of the finished members. The notches being substantially wider in angular extent than these cuts do not have to be as precisely located as the cuts, the location of the latter defining the relative phasing of the commutated sample signals. Internally of each ring blank 27', in the manufacturing process, there is molded a core 39 of adhesive plastic insulating material, preferably thermosetting, seen in completed form in Fig. 4, for example, faced on one side with a thin metallic backing plate 41 (Fig. 7) of approximately the same outside diameter as the core and axially spaced from and out of electrical contact with ring 27'. At the center of the core there is a metallic hub 43 for supporting and piloting purposes, as on frame extension or stud 44. In the molding operation the plastic material of the core fills notches 37 thereby securely keying the core to ring 27' at each notch. Prior to the molding of the core a lead, as lead 45, is soldered or otherwise attached to each proposed live contact segment of ring 27′ and is formed so as to be in part embedded or encapsulated in the core in the molding operation, thereby providing a firm support for the lead and making its end connection suitable to withstand potentially disruptive forces. These leads are brought out through holes 47 in the core and through registering holes 47′ in backing plate 41 and similarly positioned holes in other contact assemblies, as called for. A separate hole 47 may be provided for the leads attached to each member 27–1, 27–2, etc., thus facilitating the cabling and connecting of the wires. Cable 48, for example, may carry the leads to contact assembly 27–1.

After core 39 is molded and cured with leads 45 in place, the assembly of the core and ring 27′ is placed on a dividing head or other angle measuring device and the ring is cut through, radially, with a fine saw at accurately selected locations defining the boundaries of the desired contacts, thereby to divide the ring into discrete electrically insulated segments. Since the cuts fall within the angular extent of notches 37, respectively, only a relatively slight radial depth of cut is required, which is an advantage in accurately making a very fine cut. After the cuts are made the resulting segments are rigidly held in place by the plastic "keys" formed in notches 37 (the plastic being one which adheres to the metal segments). The segments thus are each held, circumferentially by two "keys" and cannot shift even during high acceleration. On each side of a contact member, as member 27–1, the plastic core 39 (on one side jointly with backing plate 41, insulated from the contact member) forms a shoulder of lesser diameter (Fig. 7) and after the contact ring is cut barrier rings 49 of insulating material and of greater outside diameter than the central contact member are cemented in position on these shoulders to form a complete unit contact assembly 51.

As many unit assemblies 51 as there are circuit poles to be commutated, two in the illustrated case, are assembled with spacers if desired, on housing extension or stud 44 coaxial with shaft 15 by means of bolts, as bolt 54, passing through holes 55 in the units. The leads for each unit, cabled and brought out through holes 47, as in cable 48, may terminate at a separate terminal block section (not shown). In a typical design there may be twenty to fifty live commutator segments per pole, or per unit 51, and brush mount 16 may rotate, for example, at 600 r.p.m. The brush wires are of small diameter, of the order of 0.005″–0.010″, and have only a slight mass so that the accelerating forces acting on them in service such as missile telemetering are of a low order of magnitude and contact bounce is avoided.

While a preferred form of the invention has been illustrated and described herein this is by way of illustration, only, and not by way of limitation of the scope of the invention.

What is claimed is:

1. In commutating apparatus for switching electrical signals in low impedance circuits the combination of a commutator brush mount supported for continuous rotation about a central axis thereof and comprising a plurality of arcuate brush supports of insulating material coaxial with said axis and extending therealong, brushes carried by said supports and extending inwardly thereof, each brush comprising a group of wires in parallel alignment in the direction of said axis, stationary collector rings and stationary ring-shaped segmentated contact members coaxially disposed along said axis each making electrical contact with one of said brushes, said contact members each comprising circumferentially disposed spaced contact segments of a metal having a low contact resistance with respect to the material of said brush wires internally supported by a core of insulating material portions of which occupy radially extending notches jointly indenting adjacent portions of the inner surfaces of a pair of adjacent contact segments, and means electrically connecting selected pairs of brushes engaging one of said collector rings and one of said segmented contact members, respectively.

2. The combination defined in claim 1 wherein said brush wires each are formed with a relatively short contact-making end portion at a sharply defined obtuse angle to a relatively long intermediate portion extending therefrom toward one of said brush supports and supplying a resilient bias urging the contact-making end portion toward engagement with the contact member or collector ring associated therewith.

3. In commutating apparatus the combination of a shaft, means for rotating said shaft, a pair of arcuate members of insulating material mounted on said shaft coaxial therewith in diametrically opposed relationship and extending axially thereof, stationary plural contact assemblies in the form of flat circular discs each having a segmentated metallic rim mounted on a central plastic insulating core molded in situ with radially extending projections thereof keying the core to the ring, said assemblies being disposed in stacked relationship coaxially of said shaft one for each commutated circuit pole, leads for external connections attached to selected segments of said metallic rim in part embedded in said core and emerging from said assemblies axially thereof through axially extending holes in the core, brushes each comprising a plurality of brush wires bearing on said metallic rims carried by said arcuate insulating members, and means for making external connections to said brushes comprising other brushes in electrical connection with said first brushes and stationary collector ring means cooperative therewith.

References Cited in the file of this patent

UNITED STATES PATENTS

| | | |
|---|---|---|
| 1,615,256 | Barry | Jan. 25, 1927 |
| 2,316,651 | Moeller | Apr. 13, 1943 |
| 2,316,652 | Moeller | Apr. 13, 1943 |
| 2,365,064 | Dreese et al. | Dec. 12, 1944 |
| 2,520,709 | Bitler | Aug. 29, 1950 |
| 2,651,834 | Klym | Sept. 15, 1953 |
| 2,661,403 | Wilson | Dec. 1, 1953 |
| 2,696,658 | Polard | Dec. 14, 1954 |
| 2,918,542 | Bentley et al. | Dec. 22, 1959 |

FOREIGN PATENTS

| | | |
|---|---|---|
| 677,779 | Great Britain | Aug. 20, 1952 |